UNITED STATES PATENT OFFICE.

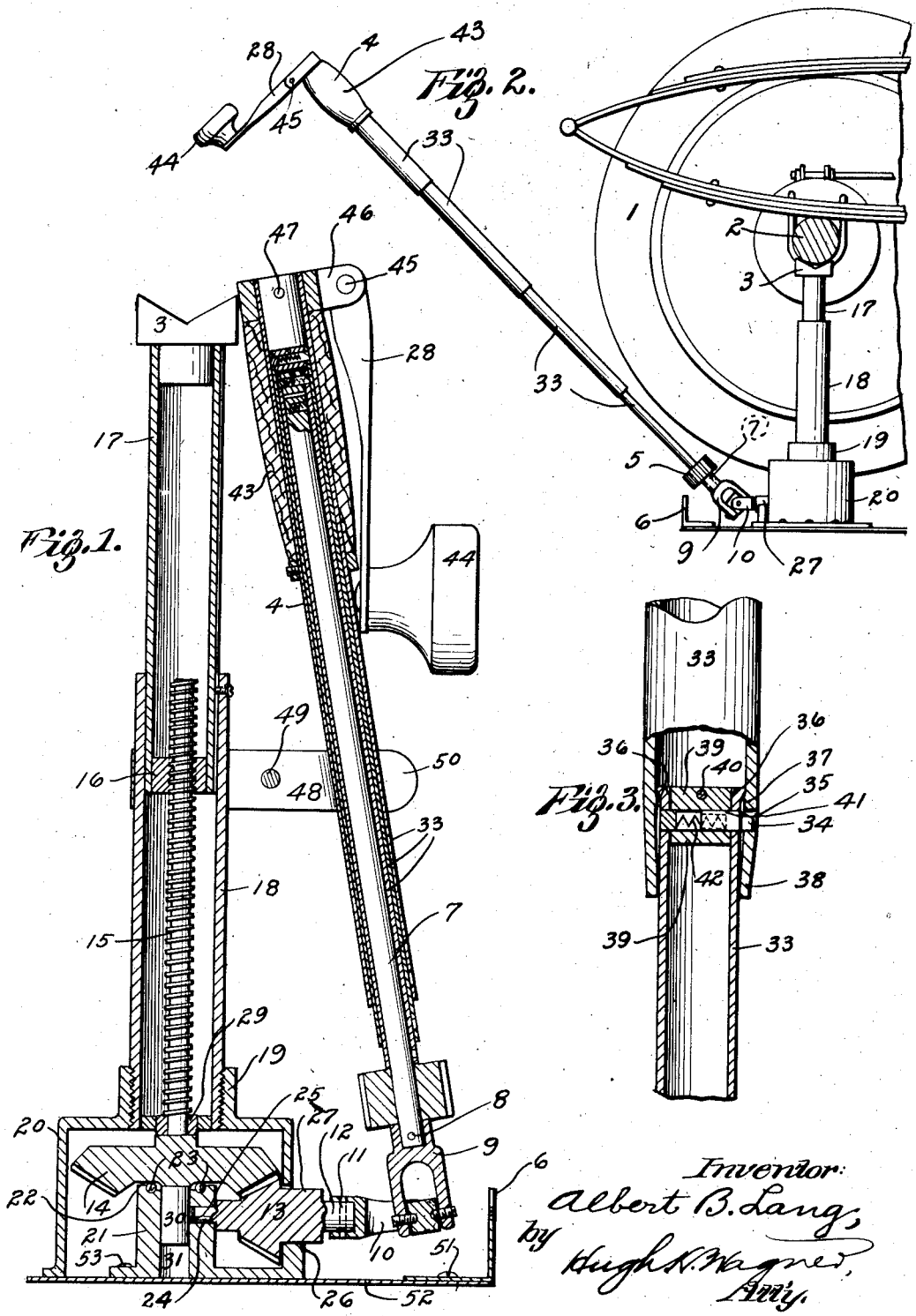

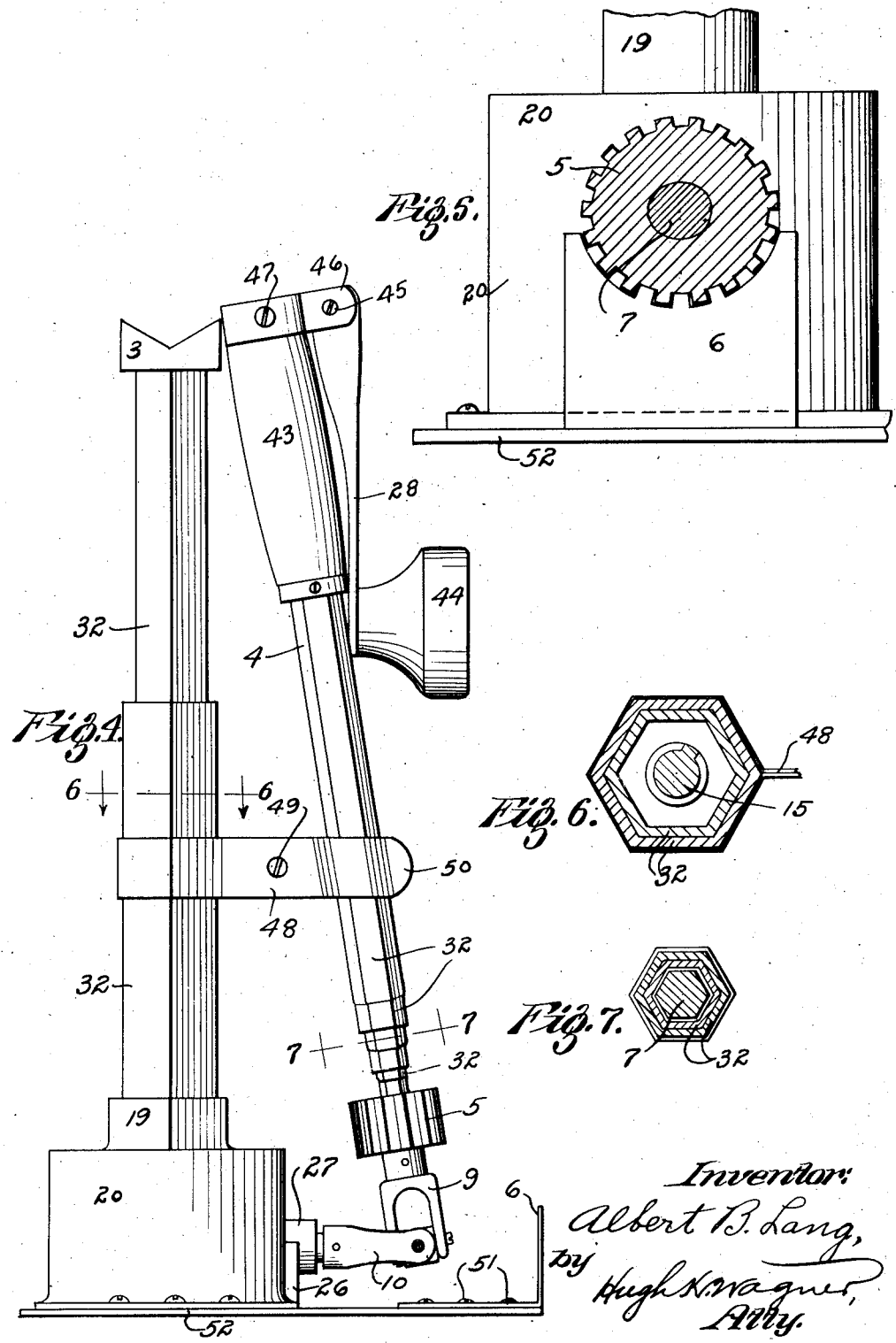

ALBERT B. LANG, OF MAPLEWOOD, MISSOURI.

JACK.

1,361,593.  Specification of Letters Patent.  Patented Dec. 7, 1920.

Application filed March 8, 1920. Serial No. 363,994.

*To all whom it may concern:*

Be it known that I, ALBERT B. LANG, a citizen of the United States, residing at the city of Maplewood, in the county of St. Louis and State of Missouri, have invented certain new and useful Improvements in Jacks, of which the following is a specification.

This invention is an improved jack, adapted for use anywhere, but especially designed and intended for use under the axle of a motor vehicle for the purpose of lifting part or the whole of such vehicle for tire or other repairs or other purposes. When used under the rear axle of a motor vehicle the advantages of this jack are especially evident, inasmuch as with this jack it is unnecessary to soil the clothes by stooping under a greasy or dirty car, as this jack can be not only operated but also moved into place under the axle by means of its long handle.

Another advantage of this jack is that not only greater power is obtained but also that such greater power is derived and applied with less muscular effort or labor.

For convenience of transportation, particularly in a motor vehicle for occasional use, the jack-handle is telescopically extensible.

In the accompanying drawings forming part of this specification, in which like numbers of reference denote like parts wherever they occur, Figure 1 is a vertical sectional view;

Fig. 2 is a side elevation showing the jack in position underneath the rear axle of a motor vehicle;

Fig. 3 is a detailed sectional view of the joint between telescoping sections of the jack-handle, the said view being on an enlarged scale;

Fig. 4 is a side elevation showing the device knocked down for transportation or packing;

Fig. 5 shows the driving pinion, with handle removed;

Fig. 6 is a sectional view on the line 6—6 in Fig. 4; and

Fig. 7 is a sectional view on line 7—7 in Fig. 4.

To lift the tire 1 from the ground, as shown in Fig. 2, it is customary to insert a jack under the axle 2. This is customarily accomplished by the person using the jack stooping low or kneeling on the ground underneath the body of the car sufficiently to place the jack-head 3 against the axle 2 and the base of the jack directly underneath upon the ground or floor. For a mechanic dressed for the occasion this is convenient, but for those dressed for pleasure or business it is ruinous to the clothes.

This jack is inserted under the axle 2 by means of the handle 4, which prior to the use of it to insert the jack under the axle, is extended in the manner shown in Fig. 2. Then pinion or notched member 5 is caused to engage lug 6, to keep the jack from turning with relation to handle 4, and then handle 4 is used to lift and push the jack into the desired position. It will be understood that pinion 5 is fixed in relation to rod 7, and the rod 7 is by pin 8 fixed to the outer half 9 of universal joint 10, while the universal joint 10 is fixed by pin 11 to shaft 12. Shaft 12 is in fixed relation to pinion 13 which meshes with beveled gear 14.

Beveled gear 14 rotates screw 15, which coacts with the threads in plug 16, located in the upper tubular member 17 of the jack, the said tube 17 being adapted telescopically to slide in either direction in the lower tubular member 18 of the jack.

Member 18 is threaded into threaded collar 19 in the casing 20 that forms the base of the jack and incloses gear 14, pinion 13, and bearing 21. A space in the top of bearing 21 contains ball bearings 23 for gear 14.

A hole 24 forms a bearing for the stub shaft projecting inwardly from pinion 13, while a bearing 26 supports the boss 27 on the outer part of pinion 13.

When the crank 28 is turned in one direction the handle 4 turns with it in the same direction, which rotates the universal joint in the same direction and with it pinion 13, whereby gear 14 is driven in the corresponding direction and screw 15 thereby rotated. Depending upon the said rotation of the various parts, the jack-member 17 and its head 3 is either lowered or raised and if there be a load upon it like axle 2 and connected parts, such load is simultaneously raised or allowed to descend.

The upper bearing for screw 15 is in screwhead plug 16 and its lower bearing is in plug 29, with an additional bearing for an enlargement or boss upon its lower end located at 30, and rotatable in channel 31 in casting or bearing 21.

In order to use the handle 4 as hereinbefore described to lift or push the jack into position for work, it is first necessary to engage the pinion or member 5 with the lug or tooth 6 and for this purpose the members 5 and 6 may be provided with either a small or a large number of teeth or even no more than one tooth and one socket (not shown in the drawings). Moreover the tooth or teeth may be on member 5 and the socket in member 6 or vice versa.

In order to cause pinion 13 to drive gear 14 and thereby screw 15 and thereby to cause the jack-head 2 to rise or fall, it is necessary that the handle 4 shall be in a position free from member 6, as shown in Fig. 2, so that member 5 will not prevent free rotation of the handle 4.

In Figs. 1 and 3 the handle is shown formed of cylindrical telescoping members, while in Figs. 4, 6, and 7 the same members are shown of polygonal form. The number of angles is immaterial.

The advantage of the polygonal form of telescoping section 32 over the cylindrical telescoping section 33 resides in the fact that it is unnecessary to pull the handle 4 to its full extended position, as shown in Fig. 2, before it begins to move or turn it, while in the form shown in Figs. 1 and 3 it is necessary to wait until the spring-pressed-dog 34 snaps or seats in aperture 35 before anything can be done with handle 4.

Each telescoping member 33 is held from disengagement with the one next larger in size by the flange 36 and bushing 37 and the inward inclination of its mouth 38. A plug 39 fastened by pin 40 to wall of each member 33 contains a slot or groove 41 for the reception and movement of dog 34 pressed by spring 42.

The handle 4 is provided with a hand-grasp 43. Crank 28 is provided with a knob or crankhandle 44. Crankhandle 44 is pivoted at 45 to a lug or lugs 46 attached by pin or screw 47 to the upper end of handle 4, so that crank 28 can be folded on folded-over handle 4, as shown in Figs. 1 and 4.

A metal band or strip 48 encircling the lower member 18 of the jack and fastened by screw 49 forms a clip 50 to hold handle 4 when knocked down.

The lug 6 is attached by a screw 51 to the baseplate 52, to which, by screw 53, bearing 21 is also attached. Likewise casing 20 is attached to baseplate 52.

It is to be understood that the bushing 37 and flange 36 are found in the polygonal sections, shown in Figs. 4, 6, and 7, as well as the tubular members, shown in Figs. 1, 2, and 3, but the plug 39 containing the slot 41, spring 42, and dog 34 are unnecessary in the polygonal form. The aperture 35 is therefore omitted in the polygonal form. The binding or bearing relation in the polygonal form has the same effect as the binding or bearing action of dog 34 in aperture 35.

Having thus described this invention, I hereby reserve the benefit of all changes in form, arrangement, order, or use of parts, as it is evident that many minor changes may be made therein without departure from the spirit of this invention or the scope of the following claims:

I claim:

1. In a jack the combination of a jack proper, gear means adapted to raise or lower the same, a handle for operating the said gear means, a universal joint between the said handle and the said gear means, a base having means in connection therewith adapted to hold the said handle stationary, and means upon the said handle adapted to coöperate with the said means in connection with the said base for the purpose of holding the said handle stationary.

2. In combination with a jack, a longitudinally adjustable handle pivotally connected to the operating means of such jack, and means positioned adjacent the base of said jack adapted to have connection, at times, with said handle whereby to prevent lateral movement of the handle with relation to said jack when the former is in a lowered position.

3. In combination with a jack, a handle universally jointed to the operating means of the jack, and means carried on the base of the jack adapted for connection, at times, with the handle, whereby to prevent lateral movement of said handle with relation to the jack by the lowering of the former for lifting the jack.

4. In combination with a jack, a handle jointed for horizontal and pivotal movement to the operating means of the jack, a toothed member carried on a portion of the handle, and a corresponding toothed member positioned adjacent the base of the jack adapted to be engaged by such member on the handle whereby to prevent lateral movement of the handle with relation to the jack during the lifting thereof.

5. In combination with a jack, a handle composed of telescopically engaged sections and having universal connection with the operating means of said jack, a toothed element carried on one of said sections of the handle, and a corresponding toothed member carried by the base of the jack adapted to be engaged by said first toothed member whereby to prevent lateral movement of the handle with relation to said jack during lifting of the same.

In testimony whereof I hereunto affix my signature.

ALBERT B. LANG.